US008963068B2

(12) United States Patent
Hagopian et al.

(10) Patent No.: US 8,963,068 B2
(45) Date of Patent: Feb. 24, 2015

(54) SYSTEM AND METHOD FOR NANOSTRUCTURE APODIZATION MASK FOR TRANSMITTER SIGNAL SUPPRESSION IN A DUPLEX TELESCOPE

(75) Inventors: John G. Hagopian, Harwood, MD (US); Jeffrey C. Livas, Severna Park, MD (US); Shahram R. Shiri, Glyndon, MD (US); Stephanie A. Getty, Washington, DC (US); June L Tveekrem, Columbia, MD (US); James J. Butler, Laurel, MD (US)

(73) Assignee: The United States of America as represented by the Administrator of the National Aeronautics Space Administration, Washington, DC (US)

( * ) Notice: Subject to any disclaimer, the term of this patent is extended or adjusted under 35 U.S.C. 154(b) by 833 days.

(21) Appl. No.: 13/193,249

(22) Filed: Jul. 28, 2011

(65) Prior Publication Data

US 2014/0061453 A1  Mar. 6, 2014

(51) Int. Cl.
*H01L 31/00*  (2006.01)
*G01J 1/02*  (2006.01)
*G02B 5/20*  (2006.01)
*B82Y 20/00*  (2011.01)

(52) U.S. Cl.
CPC ............. *G01J 1/0214* (2013.01); *G02B 5/205* (2013.01); *Y10S 977/752* (2013.01); *B82Y 20/00* (2013.01); *Y10S 977/778* (2013.01); *Y10S 977/809* (2013.01)

USPC ................. 250/214.1; 250/214 R; 977/778; 977/809; 977/752

(58) Field of Classification Search
USPC .......... 977/778, 809; 250/214.1, 216, 214 R, 250/203.1, 203.2, 203.3
See application file for complete search history.

(56) References Cited

U.S. PATENT DOCUMENTS 4,620,790 A * 11/1986 Hufnagel ...................... 356/124
2008/0299031 A1 * 12/2008 Liu et al. .................... 423/447.3

OTHER PUBLICATIONS

Hagopian et al., "Multiwalled carbon nanotubes for stray light supression in space flight instruments", SPIE Proceedings vol. 7761, Carbon Nanotubes, Graphene and Associated Devices III, Aug. 17, 2010.*

* cited by examiner

*Primary Examiner* — Francis M Legasse, Jr.

(57) ABSTRACT

Disclosed herein is a system for an apodization mask composed of multi-walled carbon nanotubes (MWCNTs) for absorbing unwanted stray light. An apodization mask is a precise pattern or shape that is mathematically derived using light scattering measurement techniques to achieve optimal light absorption.

Also disclosed herein is an apparatus for a duplex telescope with stray light suppressing capabilities comprising: a primary mirror for transmitting and receiving light; a secondary mirror for defocusing transmitted light onto the primary mirror and for focusing received light; a photodetector which receives light; a laser transmitter which transmits light; and an apodization mask for absorbing stray transmitted light.

8 Claims, 20 Drawing Sheets

SEM Image of MWCNTs on Silicon with Alumina Underlayer for Enhanced Adhesion (Removed Sections)

SEM Image of MWCNTs on Titanium Substrate

Ray Trace Code Modeling of Stray Light of MWCNTs on Silicon

Regions Affected by Stray Light Contamination

Earth Sea/Cloud Observation

Radius = 2.0 mm
Lambda = 1064 nm
z = 955.1 to 1105 mm
Fresnel Number = 1.05 to 9.9448
l/Fresnel Number = 0.1 to 0.905

902

SYSTEM AND METHOD FOR NANOSTRUCTURE APODIZATION MASK FOR TRANSMITTER SIGNAL SUPPRESSION IN A DUPLEX TELESCOPE

ORIGIN OF THE INVENTION

The invention described herein was made by employees of the United States Government. It may be manufactured and used by or for the Government for governmental purposes without payment of any royalty thereon or therefor.

BACKGROUND OF THE INVENTION

A. Technical Field

The present disclosure relates to reducing unwanted stray light in duplex telescopes by using an apodization mask of multiwalled carbon nanotubes for light absorption.

B. Introduction

Duplex communication in telescopes is performed by using a telescope with primary and secondary mirrors to simultaneously send and receive data with a single integrated transmitter/receiver unit. This integrated unit communicates data in the form of a transmitting laser and a receiving laser which share the same axis of travel (i.e., are coaxial with one another). Upon transmission, the laser beam is expanded to fill the telescope's secondary mirror and then is reflected to the primary mirror which reshapes the laser into a collimated beam of light for transmission to another telescope. Due to imperfections in the telescope however, some of the transmitted light sent by the laser emitter may reflect off of the secondary mirror, and back into the receiver unit as stray, unwanted light. In applications where the received laser power is low relative to the transmitted laser power, this stray light may interfere with or even overwhelm reception of a weak received signal, effectively blinding the telescope's receiver with a flood of its own transmitted light. Accordingly, what is needed in the art is a system and method of efficiently and effectively suppressing the unwanted, stray transmitter light.

C. Background Science

The radiometric and imaging properties of any remote sensing instrument, such as a telescope, are tied to its within, near, and far field point spread function and stray light performance. More specifically, optical performance of remote sensing instruments depends on the diffraction and stray light suppression characteristics of that instrument and involve characterizing the multi-wavelength bidirectional scatter properties of an instrument's mirrors, apertures, baffles, vanes, and scan cavities. Observations of the Earth with remote sensing instruments are extremely challenging; its large angular extent floods scientific instruments with high flux within and adjacent to the desired field of view. This bright light diffracts from instrument structures, ricochets within the instrument and invariably contaminates measurements. Astrophysical observations are also impacted by stray light that obscures very dim objects and degrades signal to noise in spectroscopic measurements. Stray light is currently controlled by utilizing low reflectance structural surface treatments such as black paint on surfaces that reflect unwanted stray light, and by using baffles and stops to limit this background noise.

Telescopes may be used for a variety of needs, one of which is communications across great distances. Simplex laser telescopes are one form of communication device in which data is sent via laser to a receiving telescope, and the communication is one-way. Duplex telescopes, however, have transmitting and receiving elements that are unified in the same device, and allow for the simultaneous transmitting and receiving of data in the form of coaxial lasers. For application to duplex telescopes, such as in the National Aeronautics and Space Administration's planned Laser Interferometer Space Antenna (LISA), the transmitted laser may be coaxial with the received laser.

The duplex telescopes in LISA may also contain a primary and secondary mirror which may allow for a two-stage expansion of the communications signal. The primary and secondary mirror may allow for the final form of the transmitted signal upon transmission to be a collimated beam of light. The same primary and secondary mirror may allow for the final form of the received signal to be a highly concentrated beam of light that may be captured by a receiver. During transmission, the expanding transmitted beam may fill the entire secondary mirror, coaxial with the received beam, which may be directed off of the primary mirror. Duplex telescopes generally face a problem of unwanted, scattered light: since the transmitted signal is nearly on axis to the center of the secondary mirror, the transmitted light may erroneously diffract off of the secondary mirror back into the receiving photodetector as stray, unwanted light. In the case of LISA, a beam may travel the entire five million kilometer distance of space between satellites, which may greatly weaken the beam: upon arrival, the received beam may only be 100 picowatts, or one-ten-billionth the beam's original strength. The duplex telescope receiving this beam may still be transmitting its own beam, which may be one watt (i.e., nine to ten orders of magnitude higher in intensity than the weak, received signal). If any of the one watt transmitted beam is erroneously diffracted back into the photodetector, the transmitted beam may greatly interfere with or even overwhelm reception a weaker received signal.

D. Problems in the Prior Art

A problem in the prior art of duplex telescopes is stray transmitted light entering the receiver. In particular, the problem often created by duplexing is that the transmitted signal is nearly on axis to the center of the secondary mirror and may reflect some transmitted light back to the receiving photodetector. In the case of LISA, the transmitted beam may be nine orders of magnitude higher in intensity and stray transmitted light should be suppressed due its overwhelming effect when reflected directly back into the receiver. Prior art methods include both painting the affected area of the secondary mirror with a dark coating or cutting a hole into the secondary mirror to allow stray transmitter light to escape.

1. Prior Art Solution 1: Flat Black Paint

The problem of stray light interference has historically been compensated through the application of black paint on reflective areas such as mirrors, apertures, baffles, vanes and scan cavities. Such paint may include (1) LORD Aeroglaze® Z306 (Z306), (2) N-Science Corporation/Advanced Surface Technologies Optical Surfaces Deep Space Black™ (Deep Space Black) and (3) Infrared Coatings, Inc. Magic Black (Magic Black).

At grazing angles however, even the darkest paint becomes reflective, requiring the introduction of multiple baffles, stops and other means of light suppression to control stray light. In sum, black paint still allows scattering of light in telescopes, possibly preventing the performance levels needed in highly sensitive laser transmissions such as in LISA.

2. Prior Art Solution 2: Cutting a Hole into the Secondary Mirror

The problems are introduced with the alternative solution of simply cutting a hole in the secondary mirror to allow some transmitted light to escape. One problem with use of a hole in the secondary mirror is the introduction of spurious light from outside sources entering the receiver. Examples of spurious light from outside sources include bright objects such as stars, planets and other celestial bodies. When stray light from other sources is introduced, using a hole may result in interference leading to unacceptable performance. Another problem introduced by cutting a hole in the secondary mirror is the engineering challenge involved. Cutting a hole may create structural weaknesses in the secondary mirror and may cause it to crack, an unacceptable risk in space telescopes where repair may be difficult or impossible due to the inaccessibility of a space telescope. A third problem with the use of a hole in the secondary mirror is spalling around the hole (the non-uniform edge around a hole created as a natural result from drilling). Evaluation of peak irradiance shows that spalling around the edges of the hole may actually contribute additional stray transmitted light into the receiver.

BRIEF DESCRIPTION OF THE INVENTION

Disclosed herein is a system and method for an apodization mask for absorbing unwanted stray light, the mask preferably composed of enhanced adhesion multi-walled carbon nanotubes (MWCNTs). An apodization mask is a precise pattern or shape that is mathematically derived using light scattering measurement techniques to achieve optimal light absorption. Also disclosed herein is an apparatus for a duplex telescope with stray light suppressing capabilities preferably comprising: a primary mirror for transmitting and receiving light; a secondary mirror for defocusing transmitted light onto the primary mirror and for focusing received light; a photodetector which receives light; a laser transmitter which transmits light; and an apodization mask for absorbing stray transmitted light. The apodization mask is composed of MWCNTs and formed into a shape mathematically derived to achieve maximum light absorption. The primary mirror may be used to collimate transmitted light and focus received light, and the secondary mirror may be used to send the receive light. The duplex telescope may communicate with other duplex telescopes.

DESCRIPTION OF THE DRAWINGS

In order to describe the manner in which the above-recited and other advantages and features of the disclosure may be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION OF THE INVENTION

A. Background Science of the Invention

Figure 1:
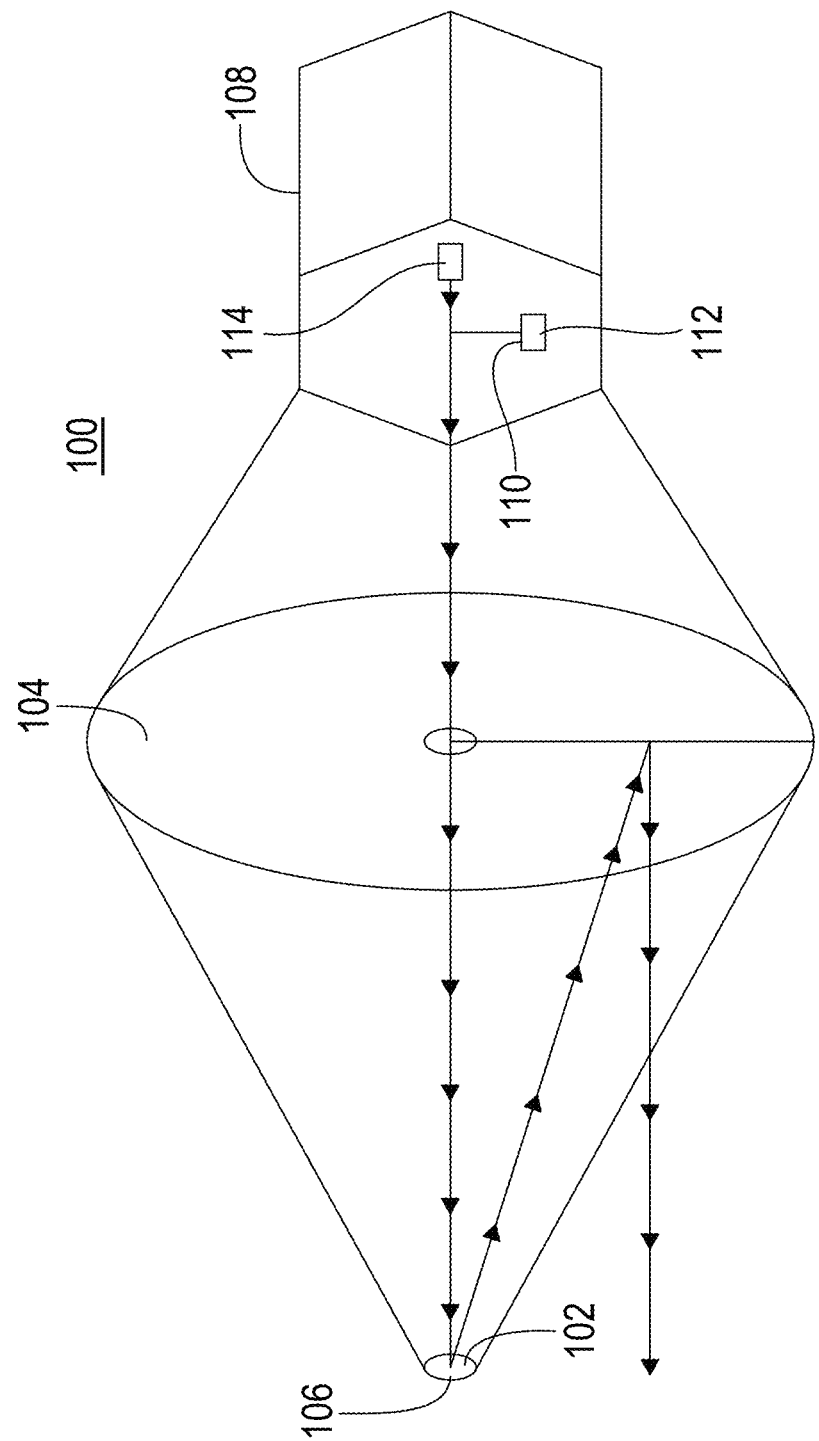
FIG. 1 illustrates an example system embodiment of a duplex telescope.

The following is written for illustration pursuant to 35 USC §112 for disclosing the best mode currently contemplated by the inventors. While specific implementations are discussed, it should be understood that this is done for illustration purposes only. A person skilled in the relevant art will recognize that other components and configurations may be used without parting from the spirit and scope of the disclosure.

1. Multiwalled Carbon Nanotubes as Light-Absorptive Material

Carbon nanotubes (CNTs) are allotropes of carbon with a cylindrical structure. In order to achieve strong light absorptive properties over a large portion of the electromagnetic spectrum, a preferred embodiment of CNTs is in the form of multiwalled carbon nanotubes (MWCNTs), whose geometry consists of multiple CNTs wrapped around each other. MWCNTs are good absorbers of light, including light striking at grazing angles, when compared to conventional means of light absorption, such as black paint. Furthermore, the potential of MWCNTs provides a significant improvement over current surface treatments, and a large resulting reduction in stray light when applied to an entire optical train. Development of this technology may provide numerous benefits including: (1) simplification of instrument stray light controls to achieve equivalent performance, (2) increasing observational efficiencies by recovering currently unusable scenes in high contrast regions, and (3) enabling low-noise observations that are beyond current capabilities.

2. Use of Invention in LISA

One application of the best mode currently contemplated for the invention is in employment of NASA's LISA mission. LISA is planned to be a group of three satellites, each satellite composed of two duplex telescopes (making a total of six duplex telescopes). The LISA satellites are planned to be deployed in an equilateral triangle formation orbiting around the sun, with each satellite approximately five million kilometers apart from the other two. As gravitational waves from distant sources reach LISA, they warp space-time, stretching and compressing the triangle. Thus, by precisely monitoring the separation between the spacecraft (by measuring distance with LISA's built-in duplex telescopes), the waves may in turn be measured. By studying the shape and timing of the waves NASA may learn about the nature and evolution of the systems that emitted them.

B. Methodology for Growth and Optimization of Enhanced Adhesion MWCNTs

1. Enhanced Adhesion MWCNT Growth Method Overview

Fabrication of light-absorbing MWCNT films may be accomplished by catalyst-assisted chemical vapor deposition (CVD). Using titanium in one embodiment as the growth substrate, the fabrication may begin with the thermal deposition of an aluminum/iron bilayer thin film catalyst. To grow MWCNTs, the substrate may be exposed to ethylene feedstock gas at approximately 750° C. in a reducing environment; the ethylene may then be dissociated at the iron surface, and the carbon may then be extruded in the form of a dense film of aligned MWCNTs. Precise patterning of the MWCNT film may be accomplished by constraining the placement of the catalyst film through conventional lithographic means. Varying the catalyst thickness, feedstock gas exposure time and hydrogen pretreat times may modulate the MWCNT geometry.

2. Substrates for MWCNT Growth

In order to achieve growth of MWCNTs, an initial structural substrate may be used as a foundation for MWCNTs to be grown upon. Enhanced adhesion MWCNTs on a silicon substrate yield excellent light-absorptive ability. However, titanium and stainless steel are preferred embodiments for applications in which the substrate must withstand structural loads, and may be used as substrate materials for the enhanced adhesion process. Using titanium and stainless steel is beneficial since they are more suited as use as a structural element than silicon, perform well in high-temperature environments, are lightweight, and also allow for growth of light-absorptive, enhanced adhesion MWCNTs. When these preferred embodiments are used as substrates for HGTiE growth process of enhanced adhesion MWCNTs, they may retain a comparable light-absorptive ability to MWCNTs grown on silicon. Another preferred embodiment is contemplated using silicon nitride as a substrate using the HGTiE growth process for use in detector applications.

Figure 11:
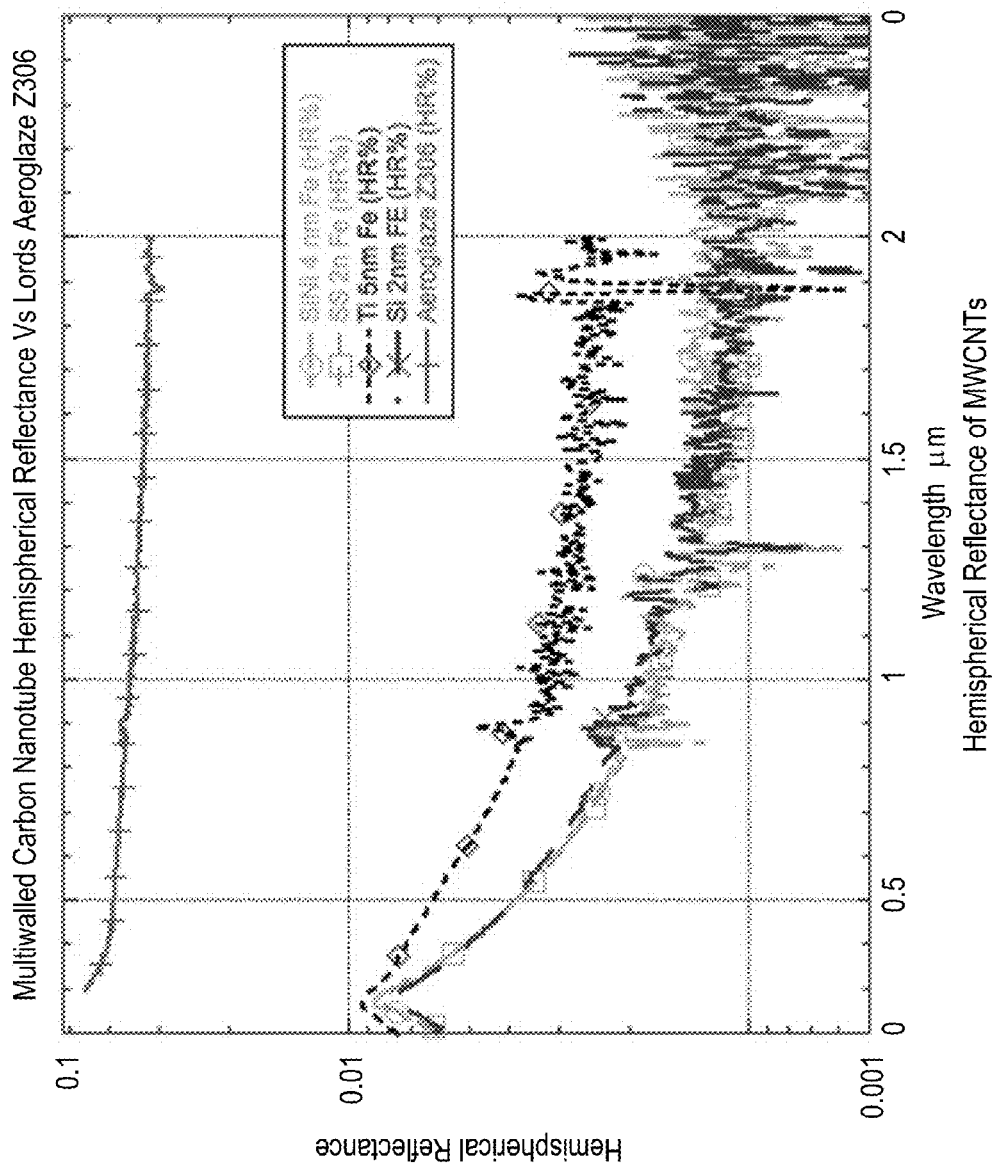
FIG. 11 illustrates Hemispherical reflectance of MWCNTs.

Hemispherical reflectance, also known as Total Integrated Scatter (TIS), is a measure of reflected light over pi steradians when light hits a sample. Hemispherical reflectance measurements of enhanced adhesion MWCNTs, according to the invention, are shown in FIG. 11: Hemispherical Reflectance of MWCNTs, as performed in a Perkin Elmer Reflectometer using Z306 as a reference.

Figure 12:
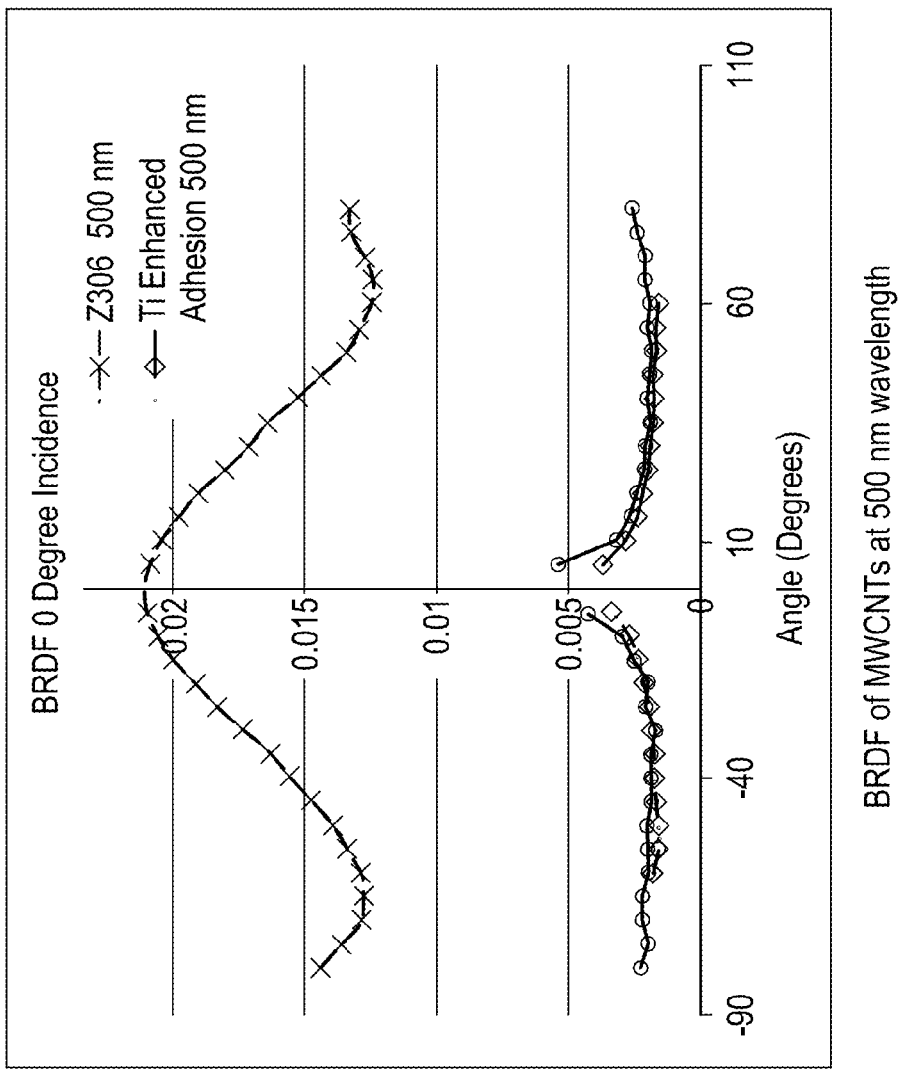
FIG. 12 illustrates BRDF of MWCNTs.

Bidirectional Reflectance Distribution Functions (BRDFs) allow for the measurement of reflectance as a function of angle. BRDF measurements of enhanced adhesion MWCNTs on titanium and silicon are shown in FIG. 12: BRDF of MWCNTS at 500 nm Wavelength and FIG. 13: BRDF of MWCNTS at 900 nm Wavelength. Again, Z306 paint is used as a reference material in each chart.

3. Substrate Surface Roughness

Roughening the substrate surface with mechanical or other means of grinding may yield improvements in the light absorptive properties of the MWCNTs. Substrate roughening should be done prior to catalyst and adhesive deposition, and MWCNT film growth.

4. Catalyst Film Sublayer

The use of a catalyst, such as an aluminum/iron thin film catalyst, assists in the growth of MWCNTs. The modulation of catalyst film thickness may lead to production of low-density, long MWCNTs. Generally, a thinner catalyst layer leads to lower-density, longer MWCNTs.

5. Adhesive Underlayer

Figure 14:
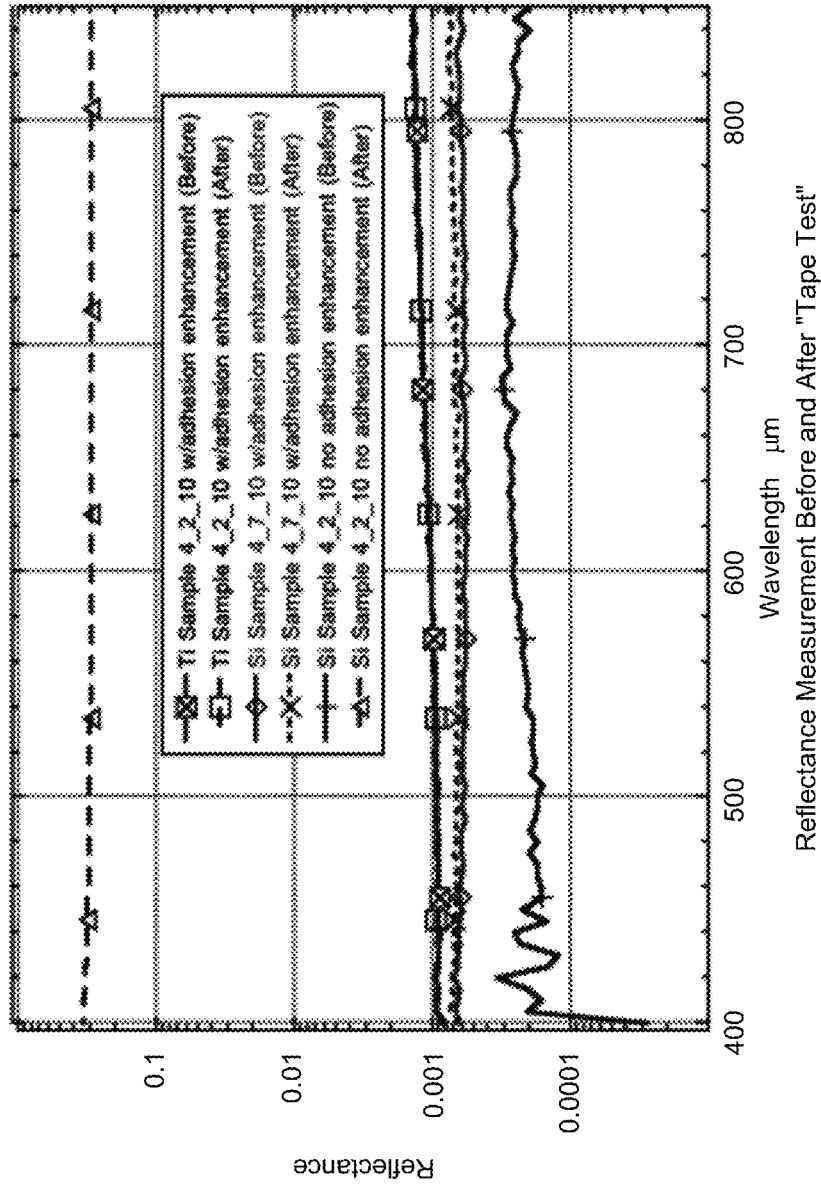
FIG. 14 illustrates Reflectance Measurements.

In order to grow MWCNTs that are robust enough to survive harsh environments such as launch conditions and space, an additional adhesive underlayer may be used under the catalyst layer to improve adhesion of the MWCNTs. When used as an adhesive underlayer, alumina provides strong adhesion of the MWCNTs that does not significantly degrade the optical properties of MWCNTs noted above. FIG. 14: Reflectance Measurement Before and After "Tape Test" illustrates reflectance measurements on samples of enhanced adhesion MWCNTs grown on titanium substrates with adhesive underlayers and silicon substrates with and without adhesive underlayers both before and after a "tape test." A tape test, such as the one employed during data collection for FIG. 14, may involve the application of standard office supply tape onto an enhanced adhesion MWCNT growth, followed by the removal of the tape. The removed tape may then be examined in order to determine the amount of MWCNTs removed from the substrate. Furthermore, reflectance measurements may be made to quantitatively determine the impact of the tape test on the light absorption capabilities of the MWCNTs. This graph indicates that the reflectance values for enhanced adhesion MWCNTs on titanium are only slightly changed by the impact of the tape test. This slight change is illustrated by the data plot for "Ti Sample 4_2_10 w/adhesion enhancement (Before)" (wherein "Before" refers to a measurement before the tape test occurs) compared to the almost identical values for the data plot "Ti Sample 4_2_10 w/adhesion enhancement (After)" (wherein "After" refers to a measurement after the tape test occurs).

6. MWCNT Geometry

Figure 15:
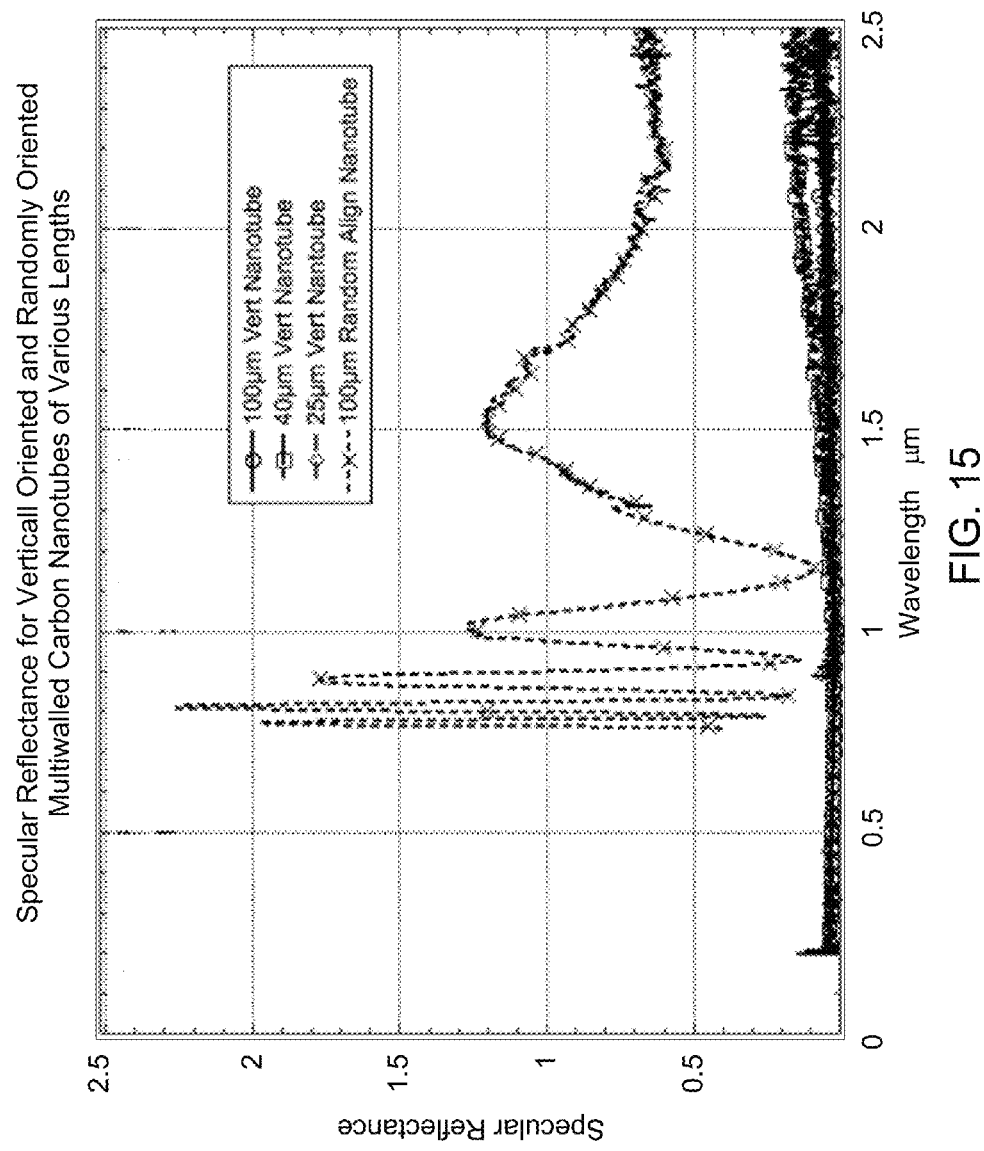
FIG. 15 illustrates Specular Reflectance of an embodiment of the invention.

In order to achieve high light absorbing performance, long length (i.e., MWCNTs with a large length to diameter ratio) and low density MWCNTs (i.e., relatively large distances between individual MWCNTs) are desired. A preferred embodiment is MWCNTs with a length of 50-100 microns and average spacing of 100-500 nanometers, as this geometry provided optimal performance. In addition, near-vertical alignment of the MWCNT growth provides superior performance over MWCNTs with similar dimensions but grown in a randomized geometry. In testing, MWCNTS with inner- and outer-diameters at 1-5 nanometers and lengths of 30-100 nanometers respectively provided significant light absorbing capabilities. FIG. 15: Specular Reflectance compares specular reflectance data for light striking at an angle of incidence at eight degrees for randomly oriented MWCNTs (labeled "Random Align Nanotube") and vertically oriented MWCNTs of varying lengths. Note that the vertically aligned nanotubes are significantly darker than the randomly oriented sample of similar diameter. In addition, the vertically aligned samples that are not as long are darker because of lower nanotube density, demonstrating the desire to optimize diameter, length, orientation and density.

7. Oxygen ($O_2$) Plasma Etching

Figure 16:
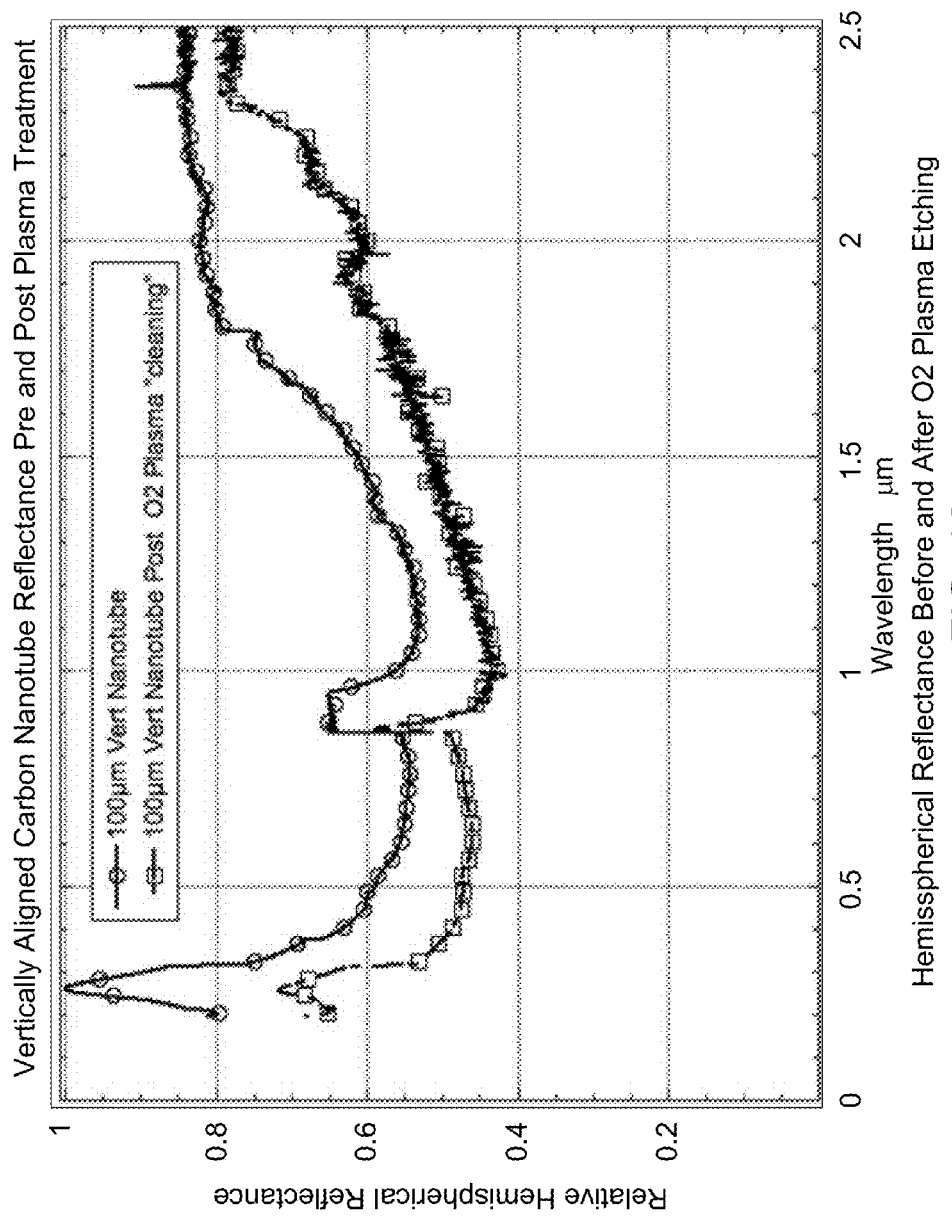
FIG. 16 illustrates Hemispherical Reflectance of an embodiment of the invention.

Using oxygen ($O_2$) plasma to etch the MWCNT film may increase the roughness and porosity of the MWCNT film, which may yield enhanced light absorptivity of approximately 20% over unetched film. FIG. 16: Hemispherical Reflectance Before and After O2 Plasma Etching compares hemispherical reflectance of MWCNTs that have and have not undergone plasma oxidation.

8. Apodization Mask of MWCNTs

Nanotubes may be grown to desired patterns by using lithographic masks to control the areas of catalyst deposition. This makes it possible to further reduce stray light by forming or growing the MWCNT mask in a particular shape that minimizes diffraction of light, as opposed to using a simple geometric shape. An apodization mask is a precise pattern or shape that is mathematically derived using light scattering measurement techniques to achieve optimal light absorption. By way of example and not limitation, an exemplary six petal hyper-gaussian shape provided eight orders of magnitude of stray light suppression in the zone of interest in testing.

Figure 17:
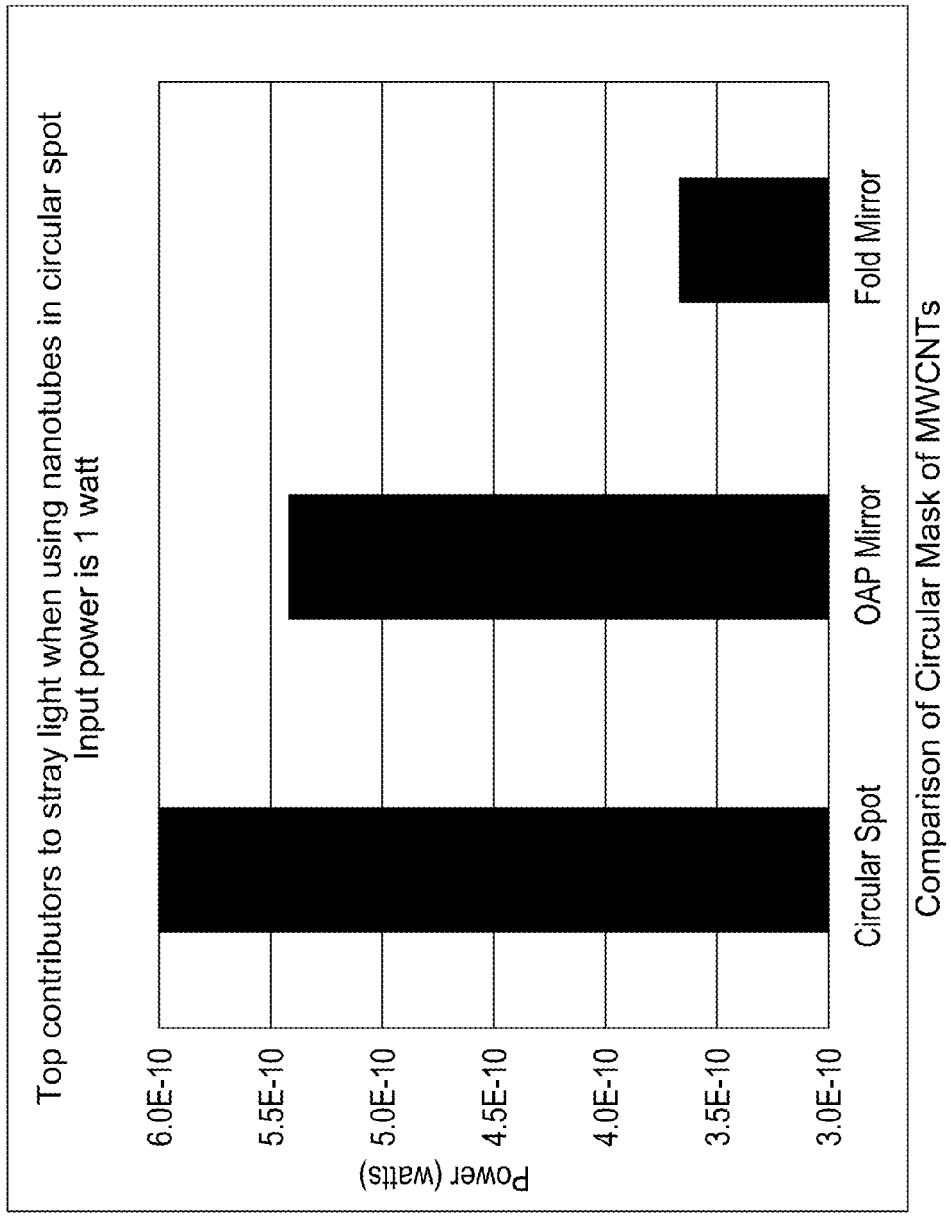
FIG. 17 illustrates Comparison of Circular Mask of MWCNTs of an embodiment of the invention.
Figure 18:
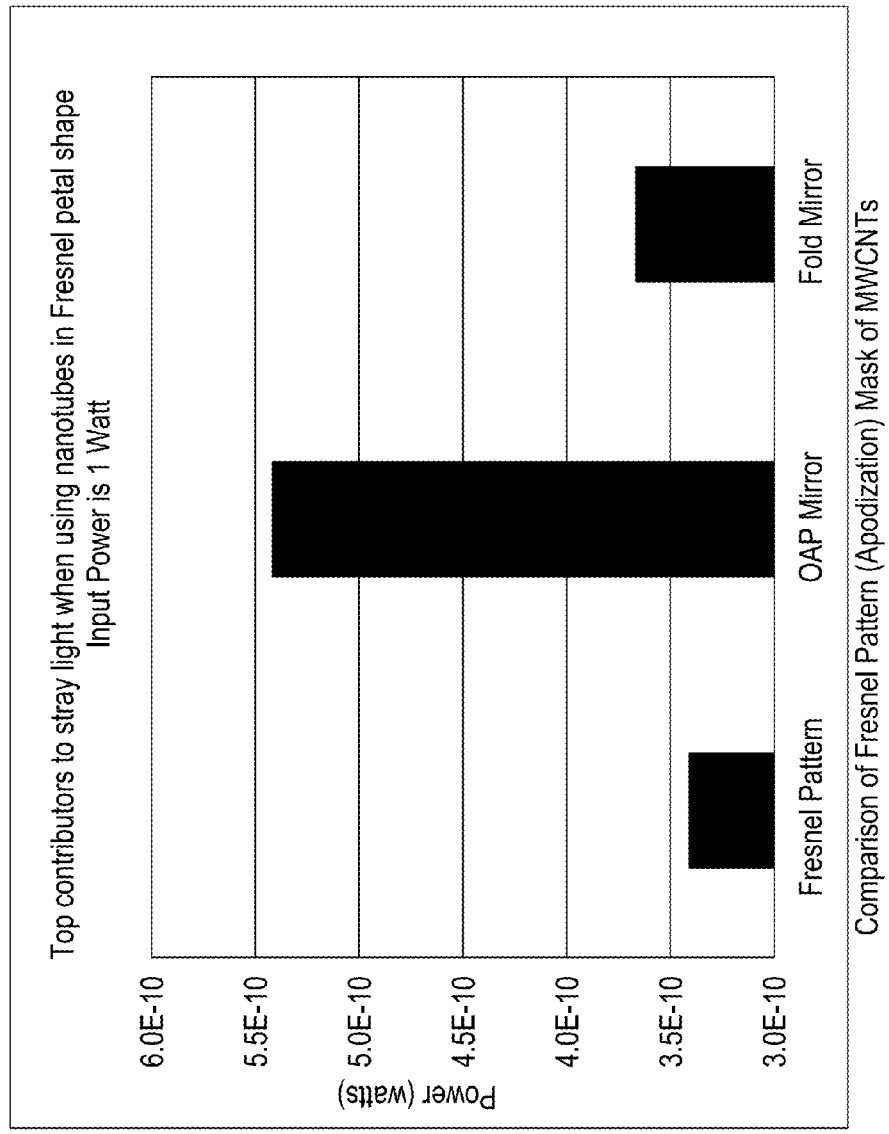
FIG. 18 illustrates Comparison of Fresnel Pattern (Apodization) Mask of MWCNTs of an embodiment of the invention.
Figure 19:
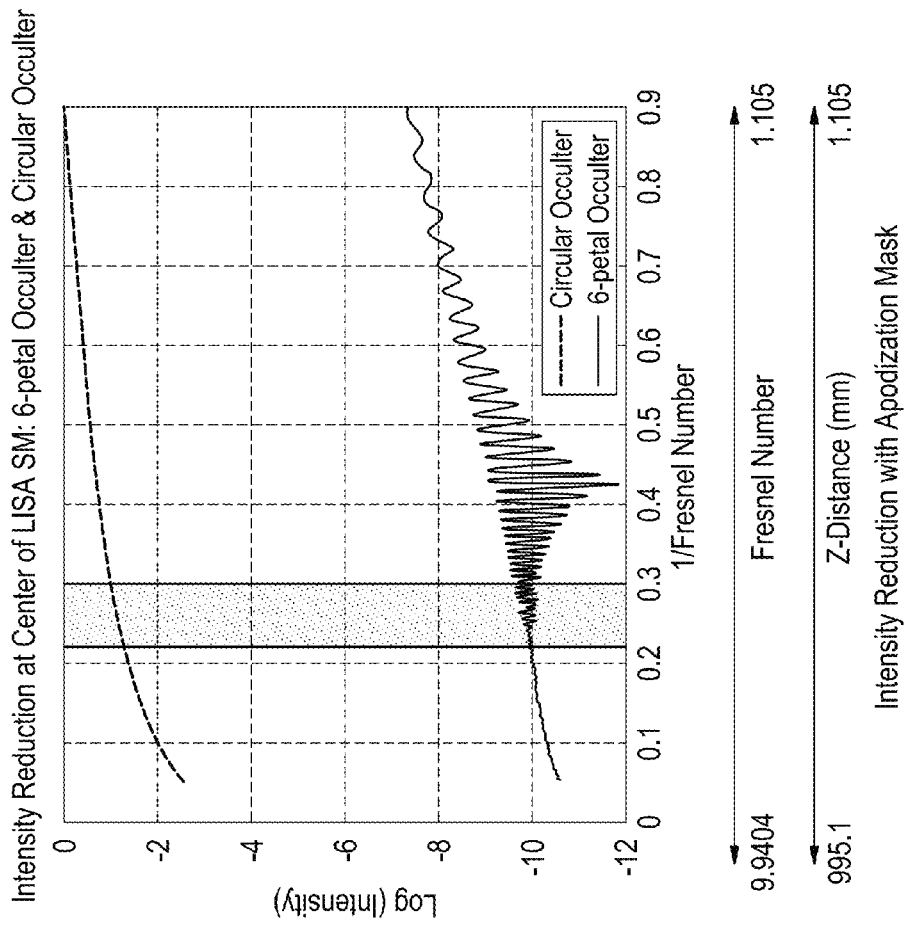
FIG. 19 illustrates Intensity Reduction with Apodization Mask of an embodiment of the invention.

Both FIGS. 16 and 17 compare stray transmitter laser reflectance values from common duplex telescope components and a light absorbing solution used on the secondary mirror of a duplex telescope. FIG. 17: Comparison of Circular Mask of MWCNTs shows the contribution of stray light from a circular MWCNT mask (labeled "circular spot"), an off-axis parabolic (OAP) mirror and a fold mirror. By way of example and not limitation, an apodization mask in the form of an exemplary six petal hyper-gaussian shape (labeled "Fresnel pattern") was used in FIG. 18: Comparison of Fresnel Pattern (Apodization) Mask of MWCNTs. FIG. 18 shows the stray light contribution from an apodization mask of MWCNTs in an example Fresnel pattern against the same OAP Mirror and Fold Mirror used in FIG. 17 for comparison. Due to the high incident power, even the circular MWCNT mask in FIG. 17 resulted in stray light contribution from the secondary mirror being the highest source of stray light. However, using the exemplary hyper-gaussian shape in FIG. 18, the contribution to stray light from the secondary mirror after the apodization mask is applied is reduced by a factor of 2, making it the smallest of the top 3 contributors to stray light. FIG. 19: Intensity Reduction with Apodization Mask illustrates intensity reduction with respect to Fresnel number and compares both a circular mask versus an apodization mask.

C. Potential Uses of the Invention

1. Remote Sensing

Improved radiometric and spatial performance of remote sensing instruments afforded by MWCNT technology could contribute to the retrieval of sea surface temperature, particularly in tropical regions where cold clouds often form over warm ocean. Other areas of remote sensing science which could directly benefit include the determination of sea ice extent and the collapse of major ice sheets, snowfall cover, and fire detection.

Satellite remote sensing of ocean color/chlorophyll is one of the most radiometrically challenging and climate-sensitive Earth science measurements that may be made. The Earth's oceans are an optically dark target in the visible and near infrared and often dotted with numerous bright clouds. It is globally sensed by NASA's SeaWiFS and MODIS instruments approximately every two days. However, approximately one week is required to obtain a complete global ocean sampling from these instruments due to cloud cover of the ocean. Improvements in near and far-field stray light performance realized through the use of MWCNTs on instrument optical and stray light surfaces may increase the number of chlorophyll retrievable pixels by 32%. Elements typically used in optical devices to control stray light, including but not limited to, mirrors, apertures, baffles, vanes, and scan cavities, may also benefit from the use of MWCNTs. Such use constitutes a significant improvement in global coverage for the study of ocean color/chlorophyll. Improved spatial and radiometric performance realized by the application of MWCNT technology may also improve the ability to perform science in coastal zones and in captured bodies of water, such as the Chesapeake Bay.

2. Electron Emission Technology

It should also be noted that MWCNTs have been used in electron emission technology, for charge balancing colloid particle micro Newton ion thrusters, and have been space flight qualified for the NASA/ESA NEW Millennium Program, ST-7/SMART-2 mission.

3. Infrared Detection and Thermal Sensing

MWCNTs may be used as a replacement for gold black thermal detectors in far-infrared and mid-infrared detection. Such MWCNTs may absorb light from all angles and may significantly improve the coupling of radiation to an infrared detector, alleviating the need for a cavity typically used in Winston Cone (conic parabolic) concentrators.

4. Other Potential Sensor Uses

Other potential uses for MWCNTs in sensing exist. MWCNTs may also be grown directly on a chip as (1) an integrated biosensor for use in detection of chemicals, and (2) as a strain gauge or pressure transducer for measuring strain and pressure respectively.

D. Benefits of the Invention

Using a MWCNT apodization mask may allow for the absorption of stray, unwanted transmitter light from entering the receiver. There are multiple benefits associated with this innovation, namely: (1) simplification of instrument stray light controls without sacrificing performance; (2) increasing observational efficiencies by recovering currently unusable scenes in high contrast regions; and, (3) enabling low-noise observations that are beyond current capabilities.

1. Benefits of MWCNTs Over Black Paint for General Stray Light Suppression

Figure 13:
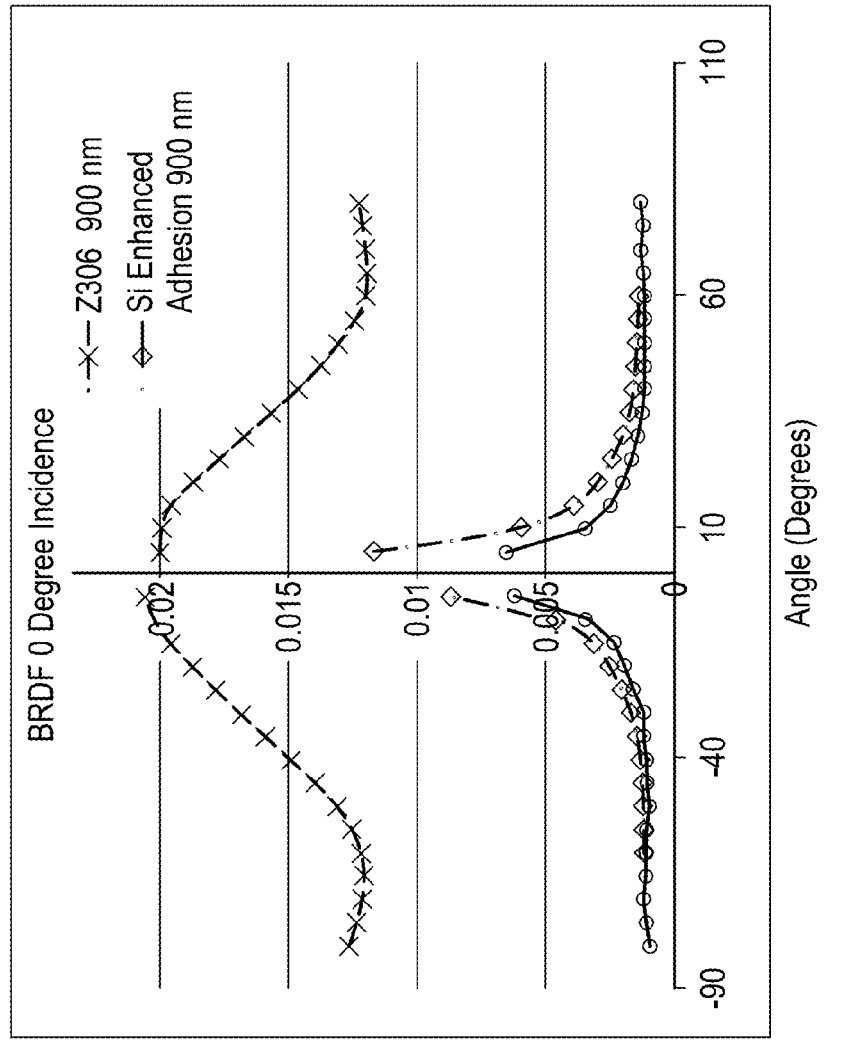
FIG. 13 also illustrates BRDF of MWCNTs.
Figure 20:
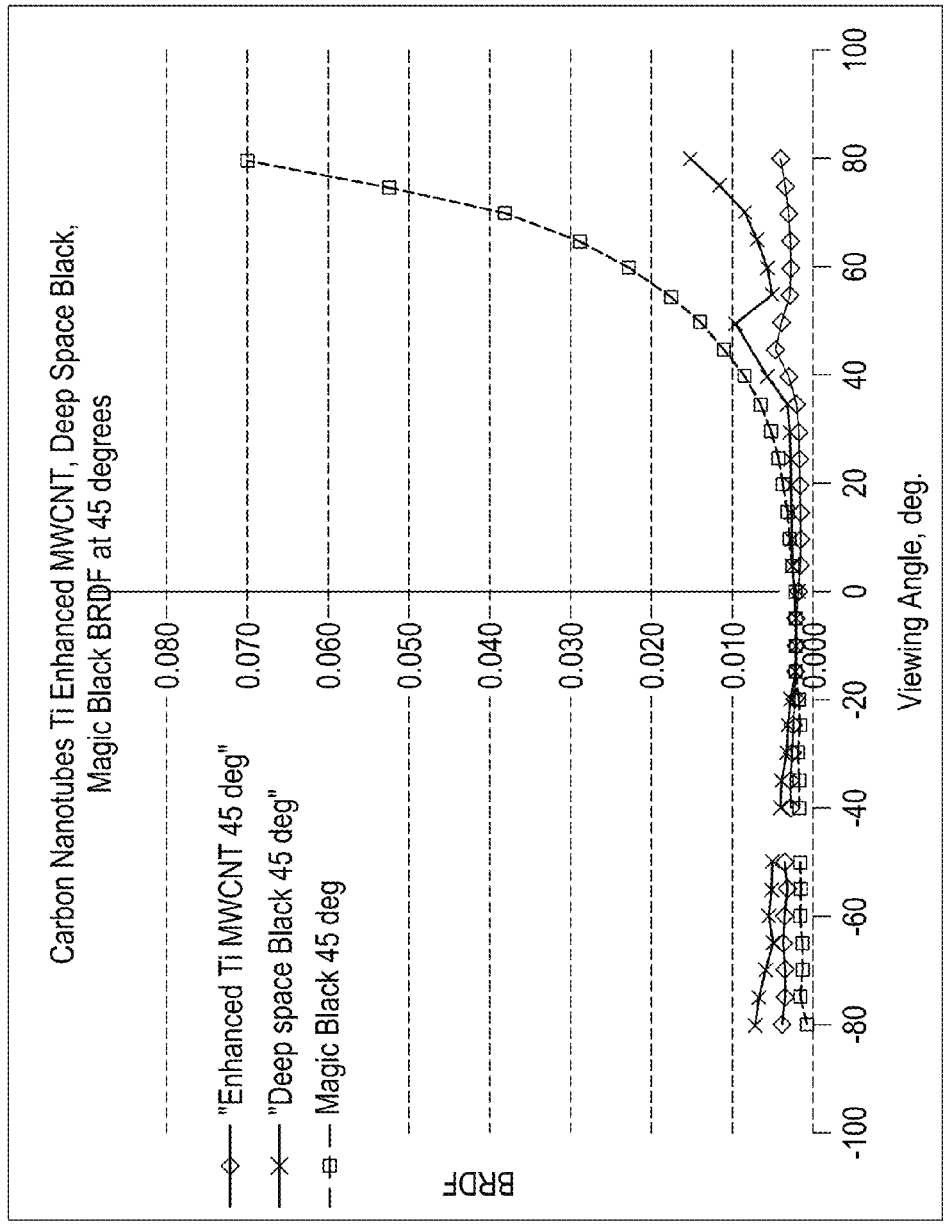
FIG. 20 illustrates BRDF of MWCNTs and Various Black Surface Treatments of an embodiment of the invention.

One skilled in the art will recognize that the problem of stray light interference has historically been compensated through the application of black paint on reflective areas. FIGS. 11, 12 and 13 (above) show light absorption performance of MWCNTs against Z306, and FIG. 20: BRDF of MWCNTs and Various Black Surface Treatments shows a BRDF of MWCNTs against Deep Space Black and Magic Black.

In scattered light measurement testing, the MWCNT apodization mask outperformed Z306 at an eleven-fold improvement. A representative NASA observatory was modeled including a telescope imaging instrument and associated optics and detector. The model included normal stray light controls which are typically treated with black paint. When MWCNTs were used in place of black paint, a Total Integrated Scatter measurement revealed an improvement in system stray light by a factor of 10,000, resulting in a factor of ten improvement in hemispherical reflectance. This measurement includes the further attenuation of stray light achieved during multiple bounces, i.e., the ricocheting of light within the instrument.

2. Benefits of MWCNTs Over Cutting a Hole into the Secondary Mirror

One skilled in the art will also be familiar with the problems that are introduced with the alternative solution of simply cutting a hole in the secondary mirror to allow some transmitted light to escape. As discussed above, several problems are introduced by cutting a hole in the secondary mirror. In testing, MWCNTs were half as effective in compensation for stray light than using a hole in the secondary mirror when the total irradiance reaching the detector is calculated, however this measurement was performed without calculating for spurious light through a hole in from the other side of the mirror. Such spurious light from outside sources will likely cause more interference at the receiver than using no light absorption solution at all.

E. Detailed Description of the Drawings

Additional features and advantages of the disclosure will be set forth in the description which follows, and in part will be obvious from the description, or may be learned by practice of the herein disclosed principles. The features and advantages of the disclosure may be realized and obtained by means of the instruments and combinations particularly pointed out in the appended claims. These and other features of the disclosure will become more fully apparent from the following description and appended claims, or may be learned by the practice of the principles set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

1. FIG. 1: Duplex Telescope

The system configuration shown herein is exemplary and involves multiple elements. Other systems may include a larger or smaller number of elements in numerous other configurations, including arrays of discrete telescopes. Other methods of transmission include other frequencies of electromagnetic radiation.

a. Signal Reception

In the example shown in FIG. 1: Duplex Telescope, the telescope 100 receives a laser coaxially with the emitted laser, which is first collected by primary mirror 104 and focused onto secondary mirror 106. The laser is then focused further through an aperture in the primary mirror 104 onto the focal surface 110 of the photodetector 112 within the aft optics 108 of the telescope 100.

b. Signal Transmission

In this example, a laser is emitted from the transmitter 114 in aft optics 108 coaxial with the received laser. The laser is transmitted through the aperture in the primary mirror 104 onto the secondary mirror 106, which defocuses the beam onto the primary mirror 104 which collimates the beam for transmission.

c. Interference of Transmitted and Received Signals

The problem created by duplexing is that the transmitted signal is nearly on axis to the center of the secondary mirror 106 which may cause transmitted light to reflect back onto the focal surface 110 of the receiving photodetector 112. The transmitted beam may be many orders of magnitude higher in intensity and may need to be suppressed due to the overwhelming interference.

d. Apodization Mask

An apodization mask of MWCNTs 102 may be affixed, grown or applied to the affected area of the secondary mirror 106 to absorb light emitted from the transmitter 114 from diffracting back onto the focal surface 110 of the receiving photodetector 112. An apodization mask composed of MWCNTs may compensate for stray light at an multi-fold improvement over a mask using flat black paint. Such an apodization mask may avoid problems generated by creating a hole in the secondary mirror 106. Cutting a hole into the secondary mirror 106 may introduce additional problems. Examples of problems include the introduction of spurious light from other sources such as astronomical bodies which may then enter receiver, and the additional engineering challenges involved in cutting a hole into a secondary mirror 106 without compromising structural integrity or optical quality of the secondary mirror 106. Using an apodization mask may also provide a more uniform background than a hole as well as avoiding the aforementioned problems.

Figure 2:
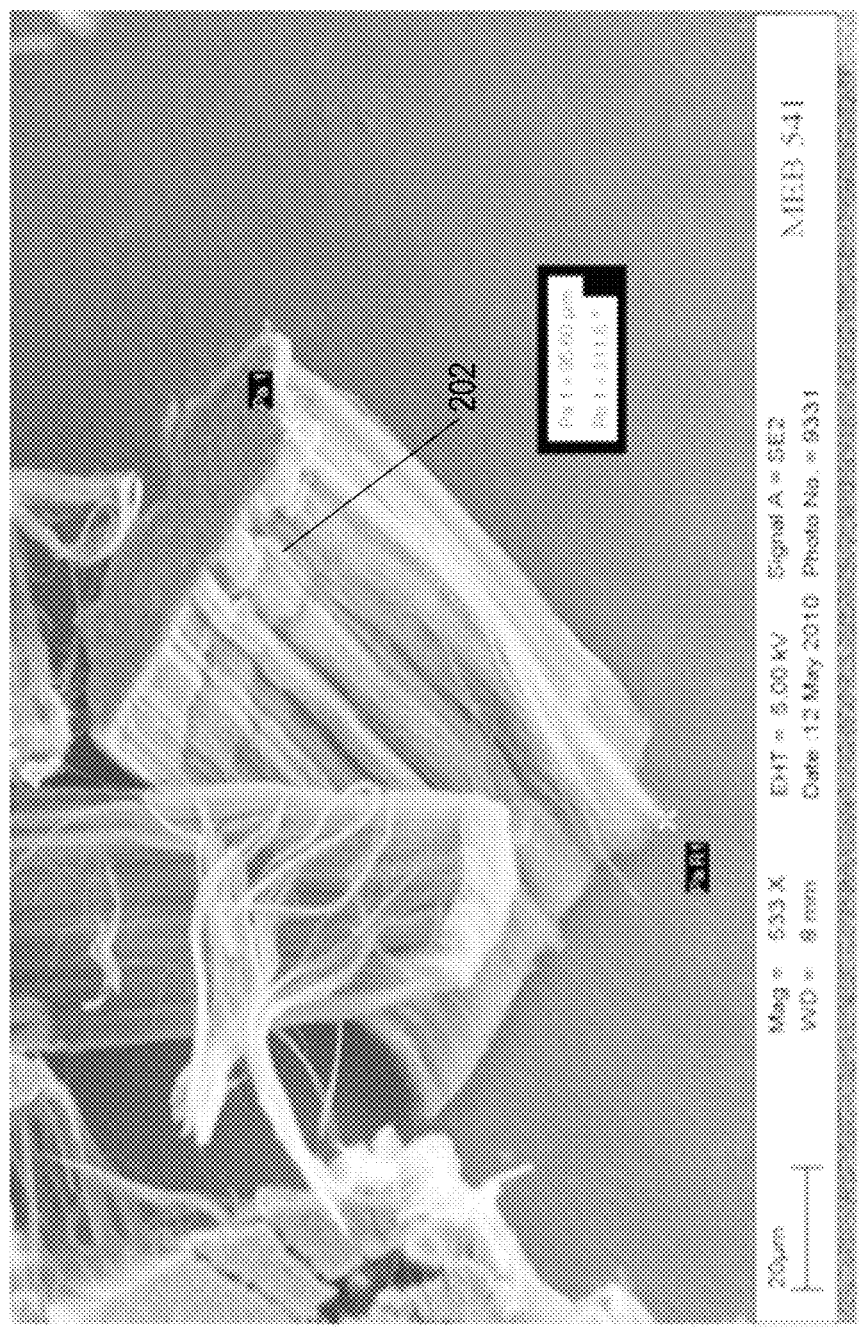
FIG. 2 illustrates an example growth pattern of MWCNTs on silicon with an alumina adhesive sublayer.

2. FIG. 2: SEM Image of MWCNTs on Silicon with Alumina Underlayer for Enhanced Adhesion (Removed Sections)

MWCNTs grown on silicon with only the iron catalyst layer generally exhibit poor adhesion; such a film of MWCNTs may be damaged or destroyed with minimal contact. Utilization of MWCNTs in space flight hardware often requires that they are robust to prevent degradation of the coating or contamination of critical components. alumina, when used as an underlayer between the catalyst layer and substrate, may provide improved adhesion between MWCNTs and the substrate upon which the MWCNTs are grown without significantly degrading the optical properties of the MWCNTs. FIG. 2: SEM Image of MWCNTs on Silicon with Alumina Underlayer for Enhanced Adhesion (Removed Sections), is a scanning electron microscope (SEM) image of a section of MWCNT film 202 that was physically removed to allow inspection. In general the film is uniform, oriented and quite robust to physical contact.

Figure 3:
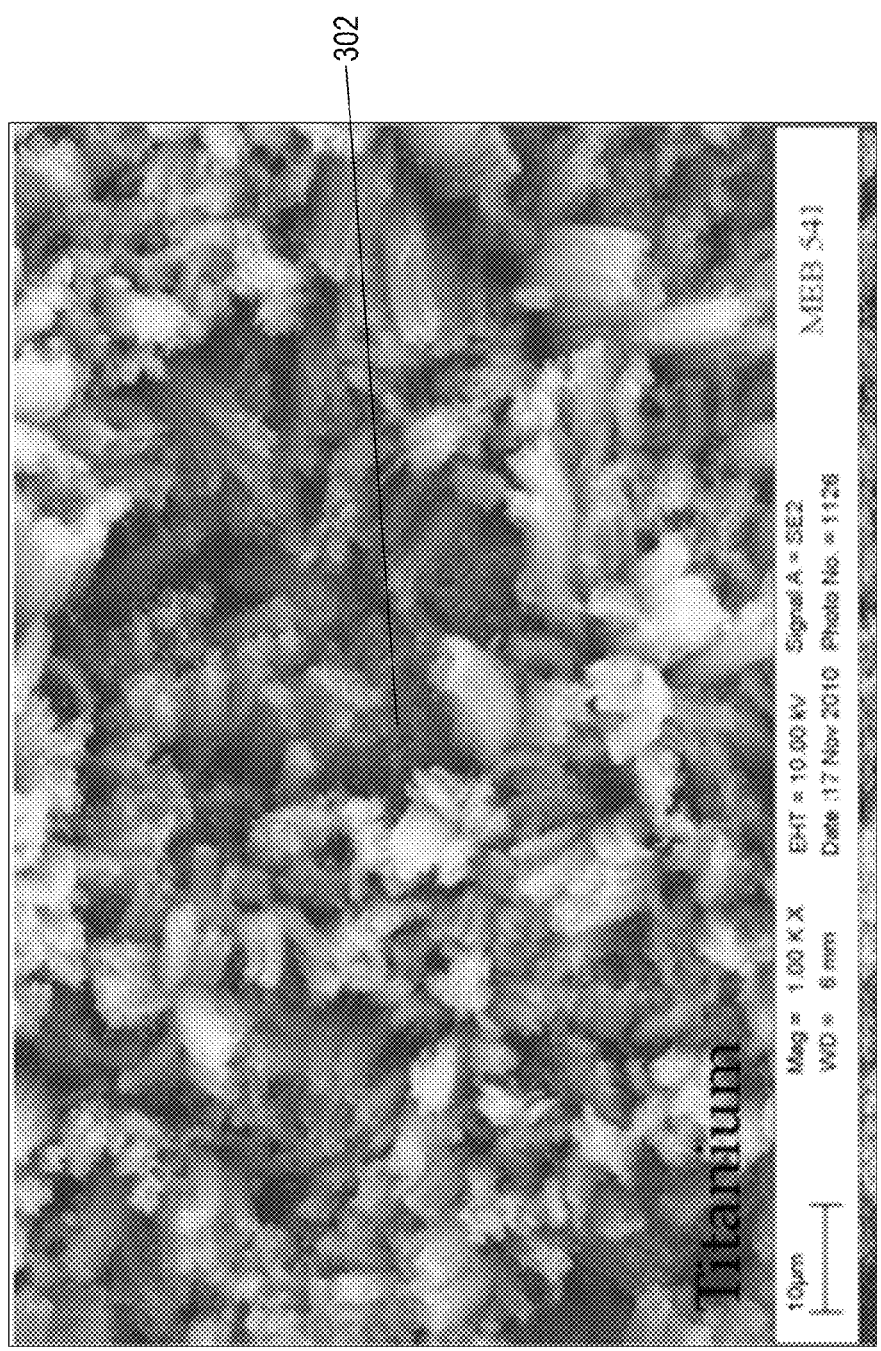
FIG. 3 illustrates an example growth pattern of MWCNTs on titanium.

3. FIG. 3: SEM Image of MWCNTs on Titanium Substrate

While silicon generally yields an excellent light-absorptive ability when used as a substrate to grow MWCNTs on, silicon is quite brittle and is not the material of choice for elements that may be subjected to structural loads. To address the need for nanotube growth on materials more suitable for load bearing, titanium may be used as a substrate. Titanium is more suited to use as a structural element that also allows for growth of MWCNT film 302 which retains a comparable light-absorptive ability to the use of a silicon substrate. FIG. 3: SEM Image of MWCNTs on Titanium Substrate, is a SEM image of growth on titanium.

Figure 4:
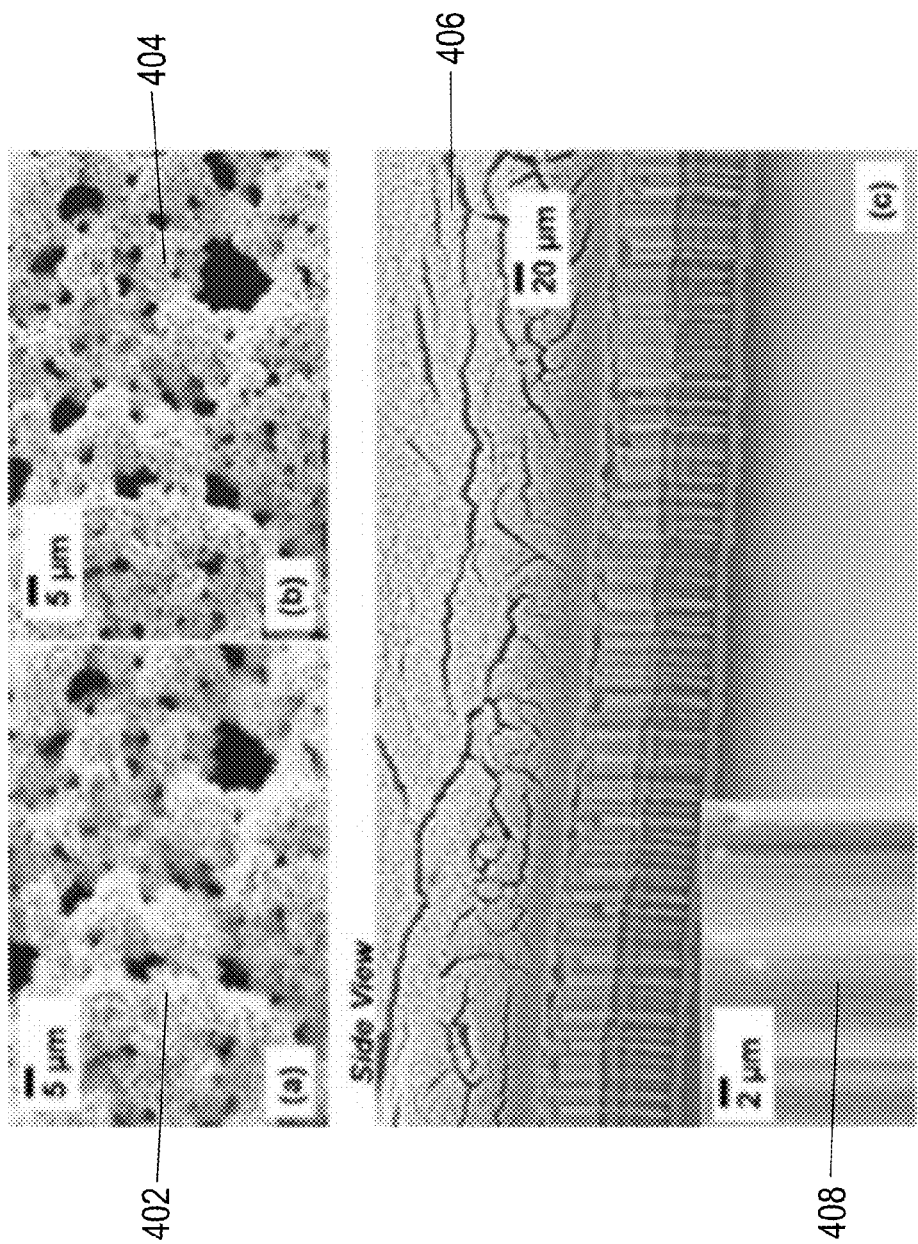
FIG. 4 illustrates the effect of surface treatment using plasma etching.

4. FIG. 4: SEM Image of Surface Treatment Using O2 Plasma Etching

Using oxygen ($O_2$) plasma to etch the surface of the of the MWCNT film may increase the roughness and porosity of the MWCNT film, yielding enhanced light absorptivity. An SEM image of plasma treated MWCNT film 402, 404, 406 and 408 is shown in FIG. 4: SEM Image of Surface Treatment using O2 Plasma Etching.

Figure 5:
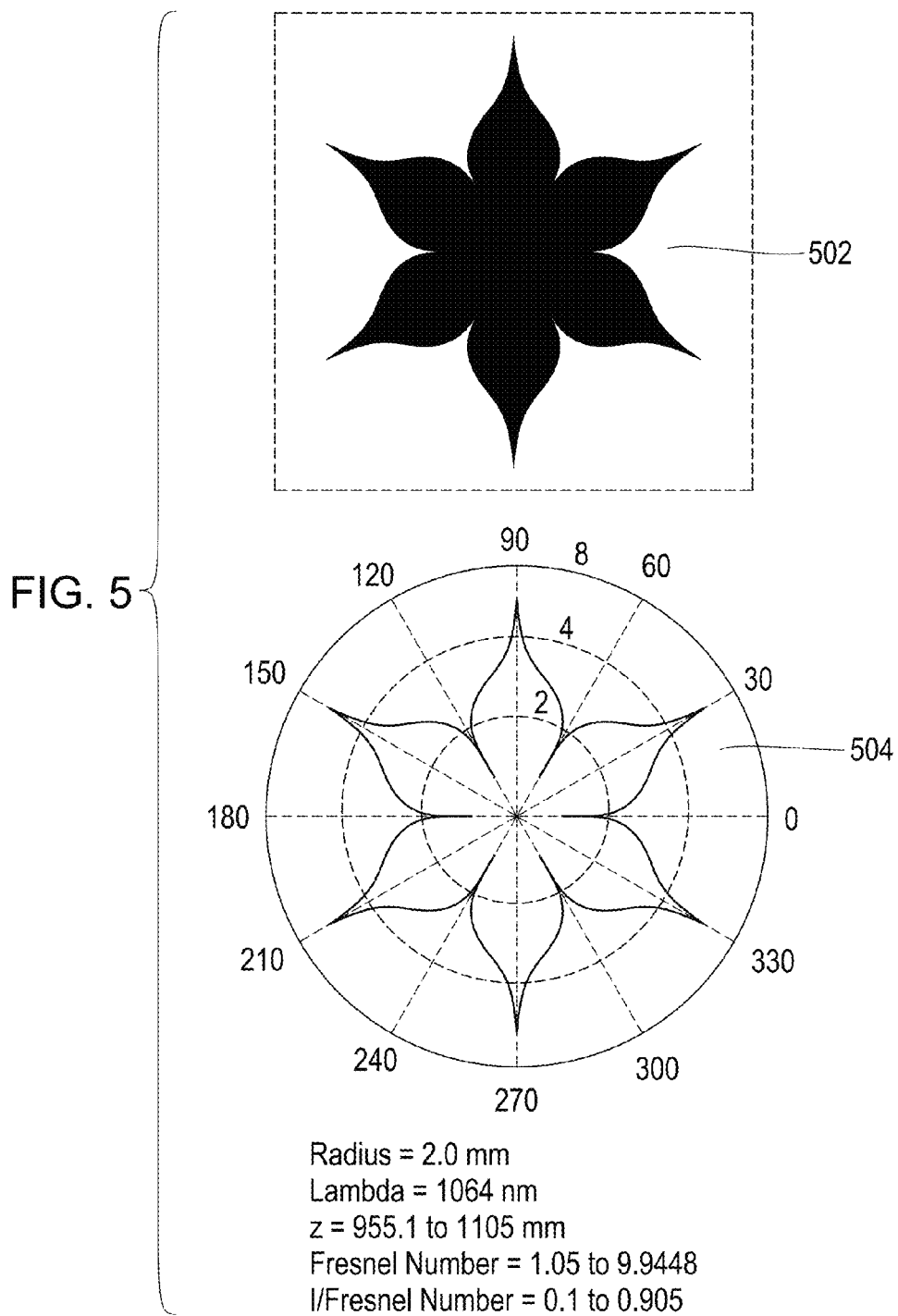
FIG. 5 illustrates an exemplary apodization mask shape.

5. FIG. 5: Apodization Mask

MWCNTs may be grown to desired patterns by using lithographic masks to control the areas of deposition. This makes it possible to further reduce the stray light in the LISA telescope by moving from, by way of example and not limitation, a circular shaped mask to a shape that minimizes diffraction. Diffraction codes used for stellar occulting systems used at NASA yielded an optimal shape for the carbon nanotube patch on the secondary mirror in the form of a hyper-gaussian shape 502, 504 resembling the petals on a flower. By way of example and not limitation, an exemplary six petal hyper-gaussian shape is shown in FIG. 5: Apodization Mask.

Figure 6:
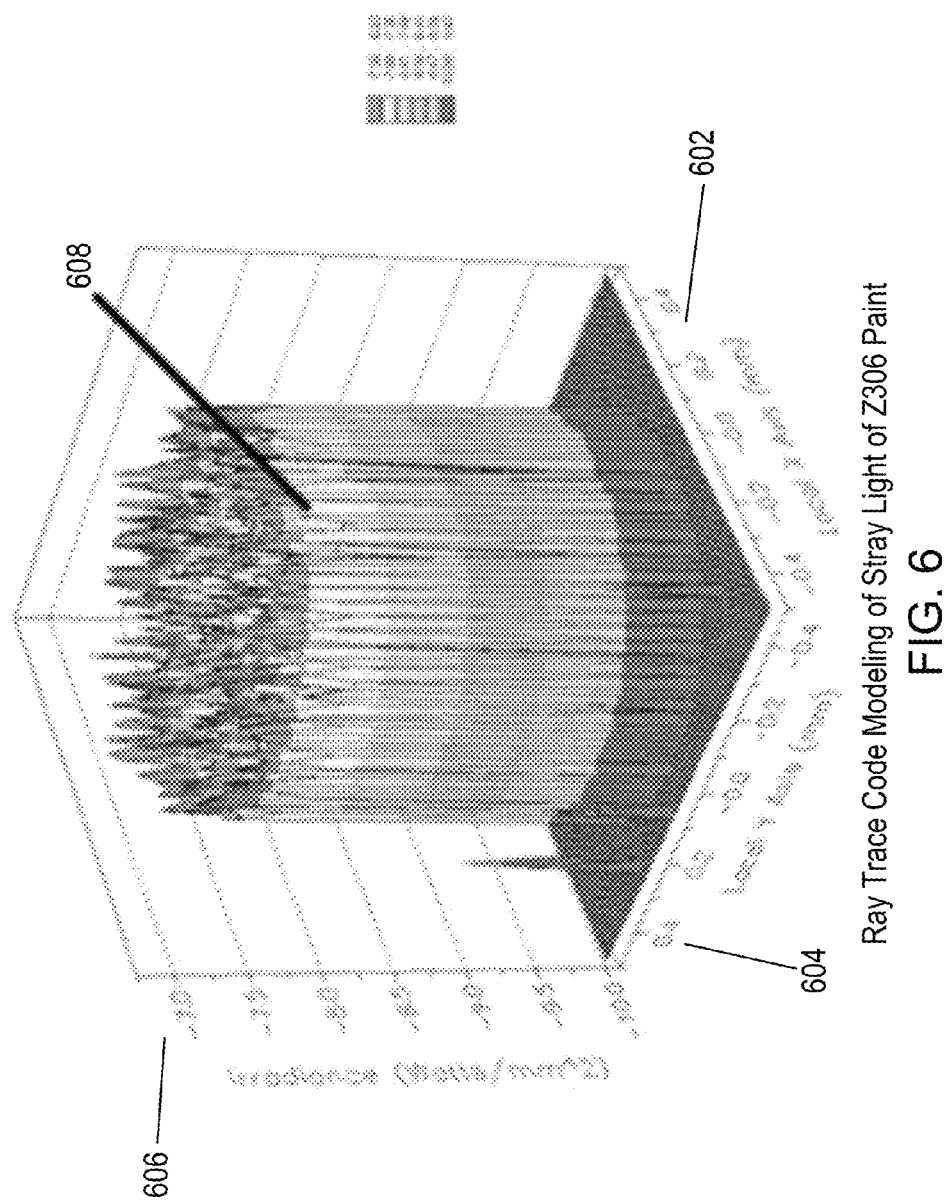
FIGS. 6, 7 and 8 illustrate a chart based on ray trace code modeling of stray light against various light absorptive materials.
Figure 7:
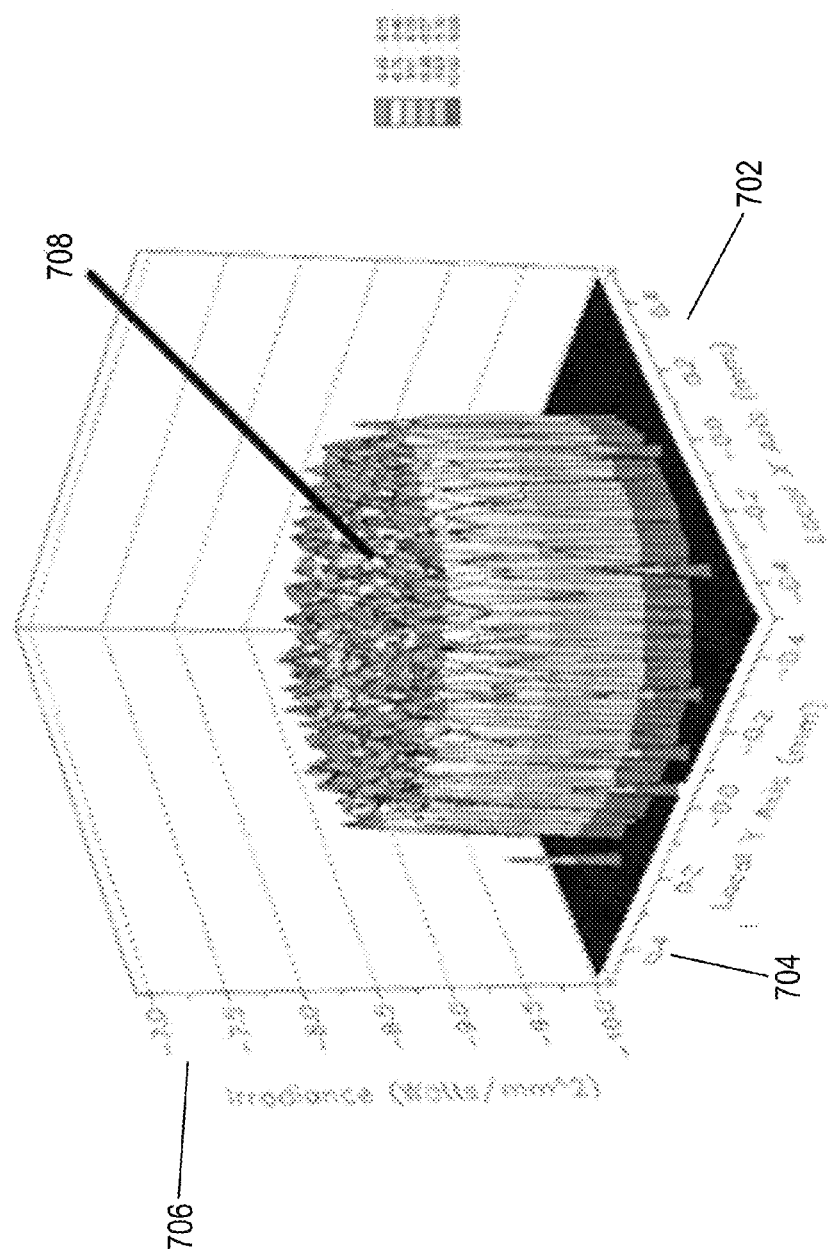
Figure 8:
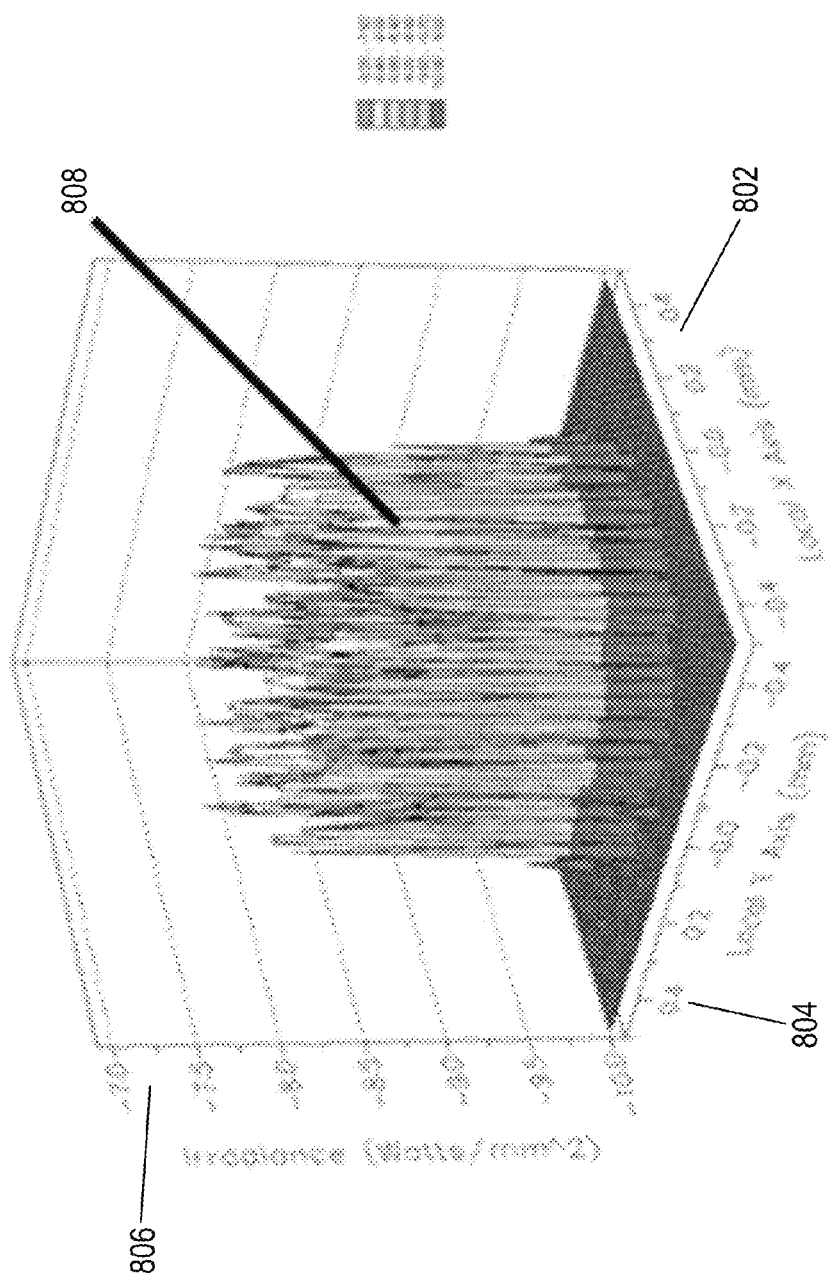

6. FIGS. 6, 7 and 8: Ray Trace Code Modeling of Stray Light of Z306 Paint, MWCNTs and Hole in Secondary Mirror Using a ray trace code may model end to end optical systems and evaluate image quality, ghosting and stray light. FIGS. 6, 7 and 8 show a ray trace code modeling of three light-absorbing solutions: a circular patch of Z306 paint, an apodization mask of MWCNTs and a hole cut into the secondary mirror 106 respectively. The X Axis 602, 702 and 802 show the length of one side of the sample in millimeters for each Z306, MWCNTs and a hole in the secondary mirror 106, respectively. The Y Axis 604, 704 and 804 show the length of the side opposing the X Axis of the sample in millimeters for each Z306, MWCNTs and a hole in the secondary mirror 1006 respectively. The Z Axis 606 706 and 806 displays values in watts per millimeter squared of irradiance. The irradiance values 608, 708 and 808 show the irradiance measurements based on noise from stray light taken from BRDF data from each sample of Z306, MWCNTs and a hole in the secondary mirror 106 respectively.

The graphs reveal that carbon nanotube patch is a factor of 11 better than the Z306 paint, but a factor of 2 worse than the hole in the secondary mirror 106 when the total irradiance reaching the detector is calculated. This calculation however does not take into account the implementation of beam dump behind the hole (since an open hole would provide a direct stray light path from other sources, such as bright stars) or the additional problems that may be introduced in fabricating a hole in the secondary mirror 106. With such a hole in the secondary mirror 106, the photodetector 112 may be directly exposed to light in front of the telescope (such as stars and other bright objects), likely creating more interference than would be avoided by using a hole. In addition, when peak irradiance is evaluated the nanotubes provide a more uniform background than the hole.

Figure 9:
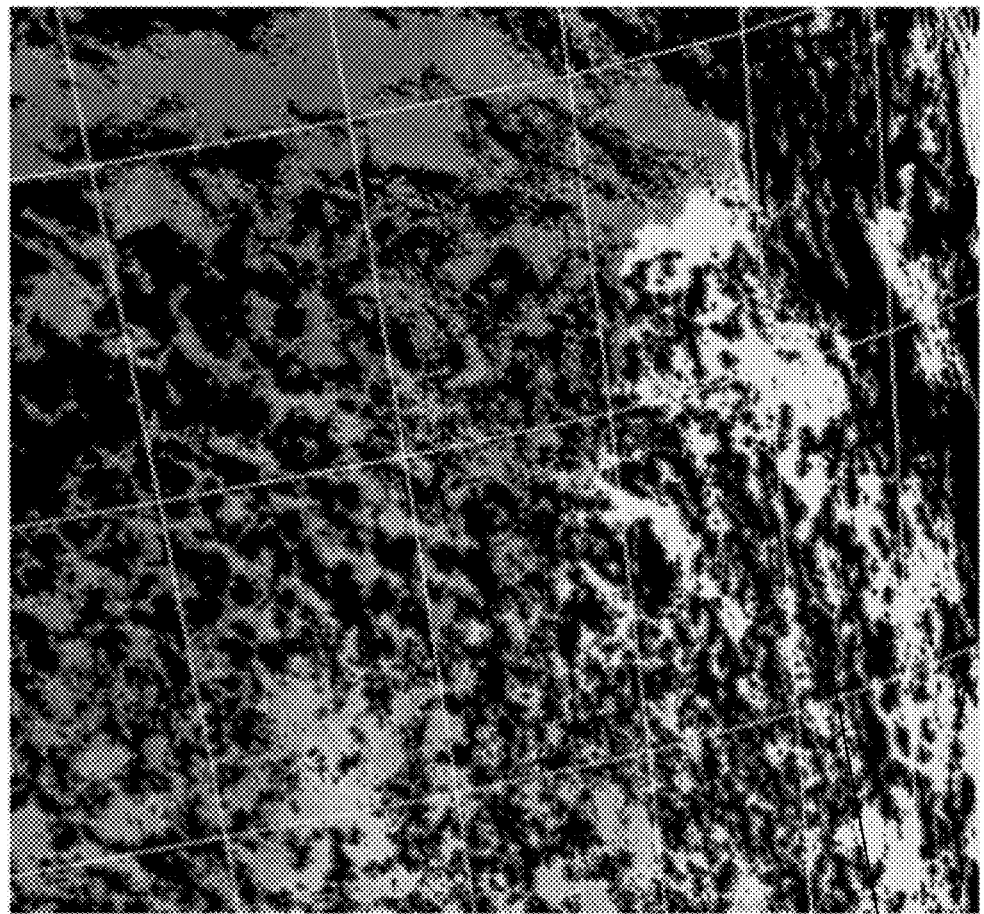
FIG. 9 illustrates a sample image of ocean chlorophyll concentration displaying the effects of stray light contamination.

7. FIG. 9: Regions Affected by Stray Light Contamination

The Earth's oceans are an optically dark target in the visible and near infrared and often dotted with numerous bright clouds. As shown in FIG. 9: Regions Affected by Stray Light Contamination, improvements in near and far-field stray light performance 902 realized through the use of MWCNTs on instrument optical and stray light surfaces may increase the number of chlorophyll retrievable pixels by 32%. This constitutes a significant improvement in global coverage for the study of ocean color/chlorophyll. Improved spatial and radiometric performance realized by the application of MWCNT technology will also improve the ability to perform science in coastal zones and in captured bodies of water, such as the Chesapeake Bay.

Figure 10:
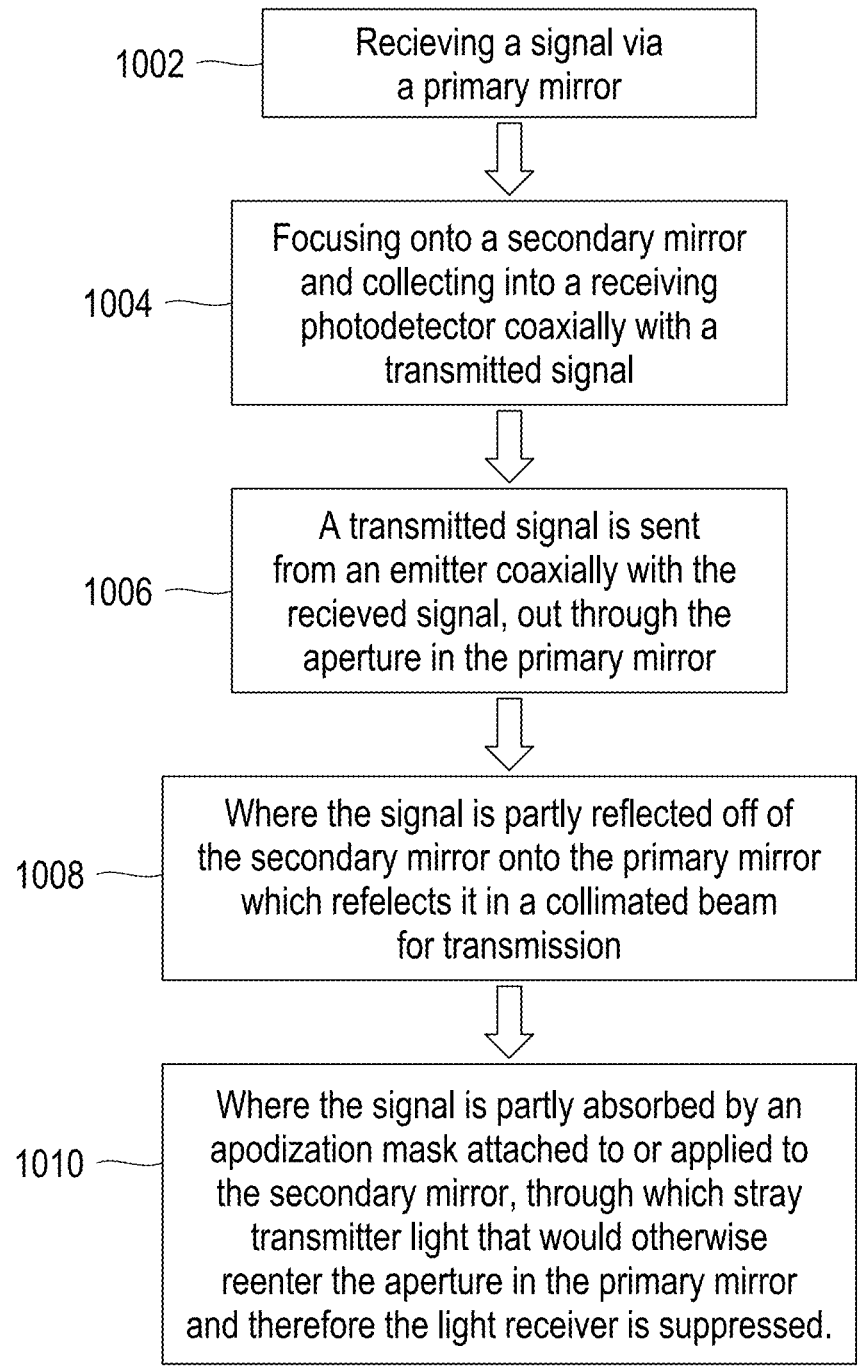
FIG. 10 illustrates the system in the form of a flow chart.

8. FIG. 10: Flow Chart

FIG. 10: Flow Chart illustrates an exemplary method embodiment for stray light suppression using an apodization mask of MWCNTs in a duplex telescope. A system practicing the method in 1002 receives a signal onto its primary mirror 104. In 1004, the system reflects the signal onto the secondary mirror 106 which focuses it through an aperture in the primary mirror and into a photodetector 112. In 1006, a transmitted signal is sent from an emitter 114 coaxially with the aforementioned received signal, out through the aperture in the primary mirror 104. In 1008, the signal is partly reflected off of the secondary mirror 106 onto the primary mirror 104 which reflects it in a collimated beam for transmission. In 1010, the signal is partly absorbed by an apodization mask 102 attached to or applied to the secondary mirror 106, through which stray transmitter light that would otherwise reenter the aperture in the primary mirror 104 and therefore the photodetector 112 is suppressed. The apodization mask 102 may be attached to the secondary mirror 106 in any one of several ways, including but not limited to, either directly applied to, or grown on, the secondary mirror 106.

The preceding is written for illustration pursuant to 35 USC §112 for disclosing the best mode currently contemplated by the inventors. While specific implementations are discussed, it should be understood that this is done for illustration purposes only. A person skilled in the relevant art will recognize that other components and configurations may be used without parting from the spirit and scope of the disclosure.

What is claimed is:

1. A space flight instrumentation apodization mask for absorbing unwanted stray light, the mask composed of multi-walled carbon nanotubes formed into a six petal hyper-gaussian shape tuned to produce a desired low reflectance over all angles of deposed metallic surfaces under high mechanical stresses.

2. The apodization mask of claim 1 wherein the mask is formed into a shape mathematically derived by using ray trace code modeling to achieve maximum light absorption.

3. A space flight instrumentation duplex telescope with stray light suppressing capabilities, comprising:
   (a) a primary mirror for transmitting and receiving light;
   (b) a secondary mirror for defocusing transmitted light onto the primary mirror and for focusing received light;
   (c) a photodetector which receives light;
   (d) a laser transmitter which transmits light; and
   (e) an apodization mask formed into a six petal hyper-gaussian shape tuned to produce a desired low reflectance over all angles of deposed metallic surfaces under high mechanical stresses for absorbing stray transmitted light.

4. The apparatus of claim 3, wherein the apodization mask is composed of multi-walled carbon nanotubes.

5. The apparatus of claim 3, wherein the apodization mask is formed into a shape mathematically derived to achieve maximum light absorption.

6. The apparatus of claim 3, wherein the primary mirror collimates transmitted light and focuses received light.

7. The apparatus of claim 3, wherein the received light is sent by the secondary mirror.

8. The apparatus of claim 3, wherein the duplex telescope communicates with other duplex telescopes.

* * * * *